United States Patent
Lechner

(10) Patent No.: US 12,526,138 B2
(45) Date of Patent: Jan. 13, 2026

(54) SECURE CONNECTIONS AND MUTUAL AUTHENTICATIONS AMONG AN INTERMEDIARY DEVICE, A CLIENT DEVICE, AND A SERVER SYSTEM

(71) Applicant: HEWLETT PACKARD ENTERPRISE DEVELOPMENT LP, Spring, TX (US)

(72) Inventor: Bryan Elliot Lechner, Richfield, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 89 days.

(21) Appl. No.: 18/425,276

(22) Filed: Jan. 29, 2024

(65) Prior Publication Data

US 2025/0247226 A1 Jul. 31, 2025

(51) Int. Cl.
*H04L 9/14* (2006.01)
(52) U.S. Cl.
CPC ..................... *H04L 9/14* (2013.01)
(58) Field of Classification Search
CPC ........................................................ H04L 9/14
See application file for complete search history.

(56) References Cited

U.S. PATENT DOCUMENTS

| | | | |
|---|---|---|---|
| 2010/0318799 A1* | 12/2010 | Simon | H04L 63/061 713/171 |
| 2013/0097424 A1* | 4/2013 | Simon | H04L 63/061 713/168 |
| 2016/0116027 A1* | 4/2016 | Muller | F16H 3/66 475/269 |
| 2017/0171293 A1* | 6/2017 | Thomassen | H04L 63/08 |
| 2017/0180123 A1* | 6/2017 | Simon | H04L 9/14 |
| 2020/0287881 A1* | 9/2020 | Pathak | H04L 63/1408 |

OTHER PUBLICATIONS

Julian Beling, "Global Information Assurance Certificate Paper, Conducting SSH Man in the Middle attacks with SSHMITM", 2002, 12 pages. (Year: 2002).*

(Continued)

*Primary Examiner* — Yonas A Bayou
(74) *Attorney, Agent, or Firm* — Trop, Pruner & Hu, P.C.

(57) ABSTRACT

In some examples, an intermediary device includes a memory to store mapping information correlating an intermediary server public key to an intermediary server private key of the intermediary device, and correlating an intermediary client public key to an intermediary client private key of the intermediary device. The intermediary device establishes a first secure connection between the intermediary device and the client device using the intermediary server public key and the intermediary server private key, where the establishing of the first secure connection comprises a mutual authentication between the intermediary device and the client device. The intermediary device establishes a second secure connection between the intermediary device and the server system using the intermediary client public key and the intermediary client private key, where the establishing of the second secure connection comprises a mutual authentication between the intermediary device and the server system.

20 Claims, 4 Drawing Sheets

(56) References Cited

OTHER PUBLICATIONS

Yubico, What is Certificate-Based Authentication? Downloaded Dec. 26, 2023 (12 pages) (Year: 2023).*

Axis Security, Administrative Guide, About Axis downloaded Dec. 26, 2023 (4 pages).

Axis Security, Axis Security ZTNA Solution Versus VPN downloaded Dec. 24, 2023 (6 pages).

Julian Beling, Global Information Assurance Certification Paper, Conducting SSH Man in the Middle attacks with sshmitm, 2002 (14 pages).

Wikipedia, "HTTPS", available online at <https://en.wikipedia.org/w/index.php?tittle=HTTPS&oldid=1195011078>, Jan. 11, 2024, 12 pages.

Wikipedia, "Post-quantum cryptography", available online at <https://en.wikipedia.org/w/index.php?tittle=Post-Quantum_cryptography&oldid=1192730221>, Dec. 31, 2023, 15 pages.

Wikipedia, "Quantum computing", available online at <https://en.wikipedia.org/w/index.php?tittle=Quantum_computing&oldid=1195545506>, Jan. 14, 2024, 31 pages.

Wikipedia, "Secure Shell", available online at <https://en.wikipedia.org/w/index.php?tittle=Secure_shell&oldid=1191590773>, Dec. 24, 2023, 12 pages.

Ylonen et al., "Network Working Group", Request for Comments: 4252, The Secure Shell (SSH) Authentication Protocol, Jan. 2006 (17 pages).

Ylonen et al., "Network Working Group", Request for Comments: 4253, The Secure Shell (SSH) Transport Layer Protocol, Jan. 2006 (32 pages).

Ylonen et al., "Network Working Group", Request for Comments: 4254, The Secure Shell (SSH) Connection Protocol, Jan. 2006 (24 pages).

Yubico, What is Certificate-Based Authentication? Downloaded Dec. 26, 2023 (12 pages).

* cited by examiner

SECURE CONNECTIONS AND MUTUAL AUTHENTICATIONS AMONG AN INTERMEDIARY DEVICE, A CLIENT DEVICE, AND A SERVER SYSTEM

BACKGROUND

Client devices can access server systems to use services of the server systems. An authentication procedure can be performed between a client device and a server system to allow for a trust relationship to be established between the client device and the server system.

BRIEF DESCRIPTION OF THE DRAWINGS

Some implementations of the present disclosure are described with respect to the following figures.

Figure 1:
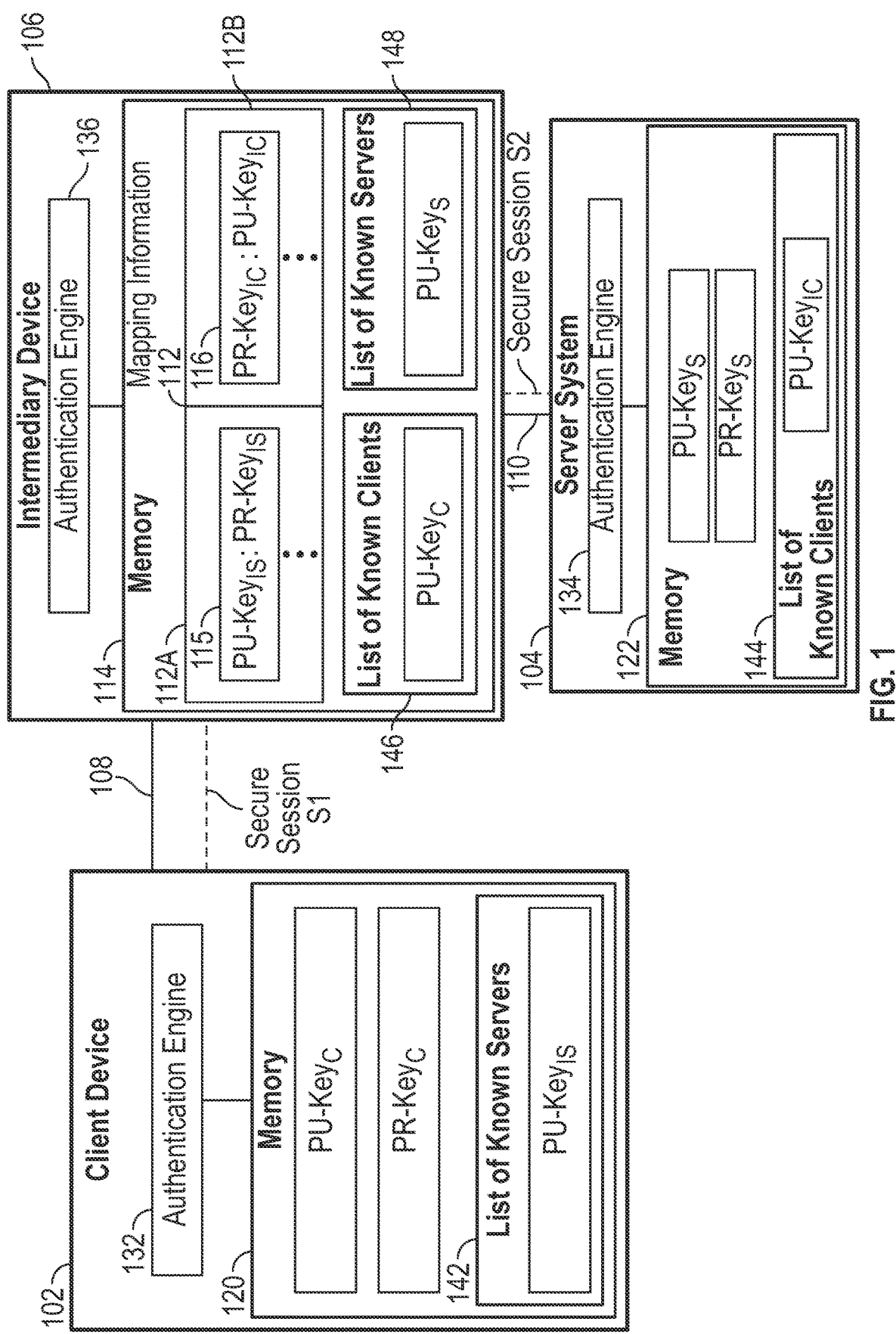
FIG. 1 is a block diagram of an arrangement that includes a client device, an intermediary device, and a server system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a client device can use user credential information (e.g., a username and password) to allow a server system to authenticate the client device. In other examples, a certificate-based authentication can be performed between a client device and a server system. In the certificate-based authentication, the client device and the server system can use certificates associated with the client device and the server system to perform authentication. Examples of certificates include public keys, including a client public key of the client device that is sent from the client device to the server system, and a server public key of the server system that is sent from the server system to the client device. In some examples, a certificate-based authentication can be according to a Secure Shell (SSH) protocol, including SSH Version 2 (SSH2). In other examples, certificate-based authentication can be according to other secure protocols.

In some scenarios, an intermediary device (e.g., a gateway or a proxy) may be provided between a client device and a server system. However, the presence of the intermediary device between the client device and the server system may prevent the establishment of communications between the client device and the server system. As part of an authentication procedure, the client device may expect to receive a message encrypted with a server certificate (including a server public key) from the server system rather than a message encrypted with the intermediary device's certificate. Similarly, the server system may expect to receive a message encrypted with a client certificate (including a client public key) from the client device rather than a message encrypted with the intermediary device's certificate. If the certificate-based authentication procedure fails, the client device would not be able to establish a trusted connection with the intermediary device. Similarly, the intermediary device may not be able to successfully perform certificate-based authentication with the server system. If authenticated connections cannot be successfully established in computing arrangements where intermediary devices are provided between client devices and server systems, then the client devices would not be able to access services provided by the server systems without the use of user credential-based authentication alone in which a user credential such as a username and password is employed.

In accordance with some implementations of the present disclosure, an intermediary device is able to perform both server and client roles for establishing connections with a client device and a server system so that the intermediary device can authorize interactions between the client device and the server system. The intermediary device is a proxy between the client device and the server system, in which the intermediary device acts as a server when establishing a first secure connection with the client device that includes a mutual authentication between the intermediary device and the client device, and the intermediary device acts as a client when establishing a second secure connection with the server system that includes a mutual authentication between the intermediary device and the server system. In some examples of the present disclosure, the intermediary device provides an intermediary server public key used for establishing the first secure connection (between the client device and the intermediary device), and an intermediary client private key used for establishing the second secure connection (between the intermediary device and the server system). The intermediary device sends the intermediary server public key to the client device, which is used by the client device to encrypt an authentication message as part of an authentication procedure to establish the first secure connection. The intermediary device sends the intermediary client public key to the server system, which is used by the server system to encrypt an authentication message as part of an authentication procedure to establish the second secure connection.

In examples of the present disclosure, the intermediary device maintains mapping information that (1) correlates the intermediary server public key to an intermediary server private key of the intermediary device, and (2) correlates the intermediary client public key to an intermediary client private key of the intermediary device. In the mutual authentication procedure between the client device and the intermediary device, the intermediary device receives a first encrypted authentication message encrypted by the client device using the intermediary server public key, the intermediary device decrypts the first encrypted authentication message using the intermediary server private key correlated by the mapping information to the intermediary server public key. Further, the intermediary device sends, to the client device, a second encrypted authentication message encrypted using a client public key of the client device for decryption at the client device using a client private key. In the mutual authentication procedure between the intermediary device and the server system, the intermediary device receives a third encrypted authentication message encrypted by the server system using the intermediary client public key, and the intermediary device decrypts the third encrypted authentication message using the intermediary client private key correlated by the mapping information to the intermediary client public key. Further, the intermediary device sends, to the client device, a fourth encrypted authentication message encrypted using a server public key of the server system for decryption at the server system using a server private key. A "mutual authentication between the intermediary system and the client device" refers to the intermediary device authenticating the client device, and the client device authenticating the intermediary device. A "mutual authentication between the intermediary system and the server system" refers to the intermediary device authenticating the server system, and the server system authenticating the intermediary device.

The "mapping information" may include one or more data structures, such as one or more files or other data structures, containing entries that map respective public keys of the intermediary device to corresponding private keys of the intermediary device.

In some examples, the keys used can be part of post-quantum cryptography (also referred to as quantum cryptography resistant) processes. Post-quantum cryptography includes use of cryptographic techniques (including public-key algorithms) that are secure against both quantum computers and classical computers. A quantum computer refers to a computer that leverages quantum mechanical effects. A classical computer is a non-quantum computer.

FIG. 1 is a block diagram of an example arrangement that includes a client device 102, a server system 104, and an intermediary device 106 between the client device 102 and the server system 104. Although FIG. 1 shows one client device 102 and one server system 104, in other examples, the intermediary device 106 may be connected between multiple client devices and multiple server systems. Also, there may be more than one intermediary device in further examples.

A "client device" can refer to any electronic device that is able to access services of the server system 104. Examples of electronic devices can include any or some combination of the following: a computer (e.g., a desktop computer, a server computer, a notebook computer, a tablet computer, or another type of computer), a smartphone, an Internet of Things (IoT) device, a household appliance, a game appliance, a vehicle, or any other type of electronic device.

The server system 104 can be implemented using one or more computers. Examples of server systems can include any or some combination of the following: a network access device that provides access to a network, a web server that provides web-based services, a cloud server that provides cloud-based services, a storage system, or any other type of system that has services accessible by client devices. Services offered by the server system 104 can include any or some combination of the following: a network access service that provides access to a network, a web service, an application program, usage of resources (e.g., processing resources, storage resources, communication resources, or other resources), or other types of functionalities. In examples where the server system 104 is a network access device, the server system 104 may include a switch, a router, a gateway, or any other device that enables access by client devices to a network.

The intermediary device 106 can be implemented using one or more computers. The intermediary device 106 is connected over a communication link 108 with the client device 102, and the intermediary device 106 is connected over a communication link 110 with the server system 104. A "communication link" can refer to any type of communication medium that allows electronic devices to communicate with one another. Examples of communication links can include wireless links or wired links, including links that are part of networks.

In some examples, the intermediary device 106 may be provided in a cloud computing environment. Messages to the intermediary device 106 (such as from the client device 102 and the server system 104) can be routed over a network such as the Internet to the intermediary device 106 in the cloud computing environment. A benefit of implementing the intermediary device 106 in the cloud computing environment is that additional resources (including processing resources, communication resources, and storage resources) can be provided for the intermediary device 106 on demand as the quantity of messages to be processed by the intermediary device 106 increases. With the intermediary device 106 in the cloud computing environment, an enterprise would not have to deploy a costly intermediary device at the enterprise's premises. Instead, the enterprise can pay for usage of resources for the intermediary device on demand as the resources are allocated by a cloud computing provider.

Although reference is made to the intermediary device 106 being in a cloud computing environment, it is noted that the intermediary device 106 can be implemented in a different computing environment in other examples, such as in a data center or another computing environment.

The client device 102 can establish secure session S1 with the intermediary device 106, and the intermediary device 106 can establish a secure session S2 with the server system 104. Data exchanged in each of the secure sessions S1 and S2 is encrypted. Note that the data (e.g., messages) in secure session S1 and the data in secure session S2 may be the same, except the data in respective secure sessions S1 and S2 may use different cryptographic algorithms and ciphers. A "cipher" refers to a secret used in encrypting data according to a cryptographic algorithm.

In accordance with some implementations of the present disclosure, the intermediary device 106 stores mapping information 112 in a memory 114 of the intermediary device 106. A memory can be implemented using one or more memory devices. Examples of memory devices include any or some combination of the following: a dynamic random access memory (DRAM) device, a static random access memory (SRAM) device, a flash memory device, or any other type of memory device. Although FIG. 1 shows an example in which the mapping information 112 is stored in the memory 114 that is part of the intermediary device 106, in other examples, the mapping information 112 (or a portion thereof) may be stored on an external storage that is outside the intermediary device 106. In either case, the memory 114 may include a secure memory protected against unauthorized access.

The mapping information 112 includes a client-side mapping information segment 112A and a server-side mapping information segment 112B. The client-side mapping information segment 112A includes entries that correlate intermediary server public keys to respective intermediary server private keys, and the server-side mapping information segment 112B includes entries that correlate intermediary client public keys to corresponding intermediary client private keys. For example, in the example of FIG. 1, the client-side mapping information segment 112A includes an entry 115 that correlates an intermediary server public key $PU\text{-}KEY_{IS}$ to an intermediary server private key $PR\text{-}KEY_{IS}$. Other entries of the client-side mapping information segment 112A correlate other intermediary server public keys to corresponding intermediary server private keys. Each entry of the client-side mapping information segment 112A includes a respective pair of an intermediary server public key and the corresponding intermediary server private key.

A given pair of an intermediary server public key and an intermediary server private key is used in performing encrypted communications from a respective client device to the intermediary device 106. For example, a first pair of an intermediary server public key and an intermediary server private key is used in performing encrypted communications from a first client device to the intermediary device 106, a second pair of an intermediary server public key and an intermediary server private key is used in performing encrypted communications from a second client device to the intermediary device 106, and so forth.

Similarly, the server-side mapping information segment 112B includes an entry 116 that correlates an intermediary client private key $PR\text{-}KEY_{IC}$ to an intermediary client public key $PU\text{-}KEY_{IC}$. Other entries of server-side mapping information segment 112B correlate other intermediary client private keys to corresponding intermediary client public keys. Each entry of the server-side mapping information segment 112B includes a respective pair of an intermediary client private key and an intermediary server public key.

A given pair of an intermediary server private key and an intermediary server public key is used in performing encrypted communications from a respective server system to the intermediary device 106. For example, a first pair of an intermediary server private key and an intermediary server public key is used in performing encrypted communications from a first server system to the intermediary device 106, a second pair of an intermediary server private key and an intermediary server public key is used in performing encrypted communications from a second server system to the intermediary device 106, and so forth.

The client device 102, the intermediary device 106, and the server system 104 exchange respective public keys with one another. More specifically, the intermediary device 106 sends the intermediary server public key $PU\text{-}KEY_{IS}$ to the client device 102 for use by the client device 102 in encrypting data sent from the client device 102 to the intermediary device 106 over the communication link 108. The intermediary device 106 decrypts encrypted data from the client device 102 using the intermediary client private key $PR\text{-}KEY_{IC}$.

The intermediary server public key $PU\text{-}KEY_{IS}$ received by the client device 102 from the intermediary device 106 is stored in a memory 120 of the client device 102. The memory 120 of the client device 102 also stores a client public key $PU\text{-}KEY_C$ and a client private key $PR\text{-}KEY_C$ (a public-private key pair of the client device 102). The client device 102 sends the client public key $PU\text{-}KEY_C$ to the intermediary device 106, which is stored in the memory 114. The intermediary device 106 can use the client public key $PU\text{-}KEY_C$ to encrypt data sent from the intermediary device 106 to the client device 102 over the communication link 108. The client device 102 decrypts the encrypted data from the intermediary device 106 using the client private key $PR\text{-}KEY_C$.

Similarly, the intermediary device 106 sends intermediary client public key $PU\text{-}KEY_{IC}$ to the server system 104 for use by the server system 104 in encrypting data sent from the server system 104 to the intermediary device 106 over the communication link 110. The intermediary device 106 decrypts encrypted data from the server system 104 using the intermediary client private key $PR\text{-}KEY_{IC}$.

The server system 104 stores the intermediary client public key $PU\text{-}KEY_{IC}$ in a memory 122 of the server system 104. The memory 122 of the server system 104 also stores a server public key $PU\text{-}KEY_S$ and a server private key $PR\text{-}KEY_S$ (a public-private key pair of the server system 104). The server system 104 sends the server public key $PU\text{-}KEY_S$ to the intermediary device 106, which stores the server public key $PU\text{-}KEY_S$ in the memory 114. The intermediary device 106 uses the server public key $PU\text{-}KEY_S$ to encrypt data that is sent to the server system 104 over the communication link. The server system 104 decrypts the encrypted data from the intermediary device 106 using the server private key $PR\text{-}KEY_S$.

In some examples, the memory 120 of the client device 102 can also store a list of known servers 142, which can include a list of information elements associated with servers that are known to the client device 102. A list of "known" servers or clients can refer to servers or clients for which information is provided to a given device ahead of any interactions between the given device and the clients or servers, such as by a human administrator, a program, or a machine. For example, the list of known servers 142 may be provided to the client device 102 before any interactions between the client device 102 and the servers represented by the list of known servers 142.

In some examples, the list of known servers 142 can include a list of server public keys for the known servers. For example, the intermediary device 106 is an example of a server that may be represented in the list of known servers 142. In such examples, the list of known servers 142 would include the intermediary server public key $PU\text{-}KEY_{IS}$ (as well as any other server public keys of servers known to the client device 102).

The list of known servers 142 may be used by the client device 102 to validate a server public key received from a server, such as the intermediary device 106. In other examples, the list of known servers 142 is not provided to the client device 102 ahead of interactions with servers.

The memory 122 of the server system 104 may similarly include a list of known clients 144, which can include information elements associated with clients that are known to the server system 104. For example, the list of known clients 144 can include a list of client public keys for clients that are known to the server system 104. The intermediary device 106 is an example of a client that may be represented in the list of known clients 144. In such examples, the list of known clients 144 would include the intermediary client public key $PU\text{-}KEY_{IC}$ (as well as any other client public keys of clients known to the client device 102). The list of known clients 144 may be used by the server system 104 to validate a client public key received from a client, such as the intermediary device 106. In other examples, the list of known clients 144 is not provided to the server system 104 ahead of interactions with clients.

The memory 114 of the intermediary device 106 may also store a list of known clients 146, which can include information elements associated with clients that are known to the intermediary device 106. For example, the list of known clients 144 can include a list of client public keys for clients that are known to the intermediary device 106. The client device 102 is an example of a client that may be represented in the list of known clients 146. In such examples, the list of known clients 146 would include the client public key $PU\text{-}KEY_C$ (as well as any other client public keys of clients known to the intermediary device 106). The list of known clients 146 may be used by the intermediary device 106 to validate a client public key received from a client, such as the client device 102. In other examples, the list of known clients 146 is not provided to the intermediary device 106 ahead of interactions with clients.

The memory 114 of the intermediary device 106 may also store a list of known servers 148, which can include a list of information elements associated with servers that are known to the intermediary device 106. In some examples, the list of known servers 148 can include a list of server public keys for the known servers. For example, the server system 104 is an example of a server that may be represented in the list of known servers 148. In such examples, the list of known servers 148 would include the server public key PU-KEY$_S$ (as well as any other server public keys of servers known to the intermediary device 106).

The list of known servers 148 may be used by the intermediary device 106 to validate a server public key received from a server, such as the server system 104. In other examples, the list of known servers 148 is not provided to the intermediary device 106 ahead of interactions with servers.

As further depicted in FIG. 1, the client device 102 includes an authentication engine 132, the server system 104 includes an authentication engine 134, and the intermediary device 106 includes an authentication engine 136. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The authentication engines 132, 134, and 136 can perform mutual authentication procedures. More specifically, the authentication engines 132 and 136 can perform a mutual authentication procedure between the client device 102 and the intermediary device 106 to authenticate one another, and the authentication engines 136 and 134 can perform a mutual authentication procedure between the intermediary device 106 and the server system 104 to authenticate one another.

The establishment of the secure session S1 between the client device 102 and the intermediary device 106 occurs in response to the client device 102 and the intermediary device 106 authenticating one another. Similarly, the establishment of the secure session S2 between the intermediary device 106 and the server system 104 occurs in response to the intermediary device 106 and the server system 104 authenticating one another.

Figure 2:
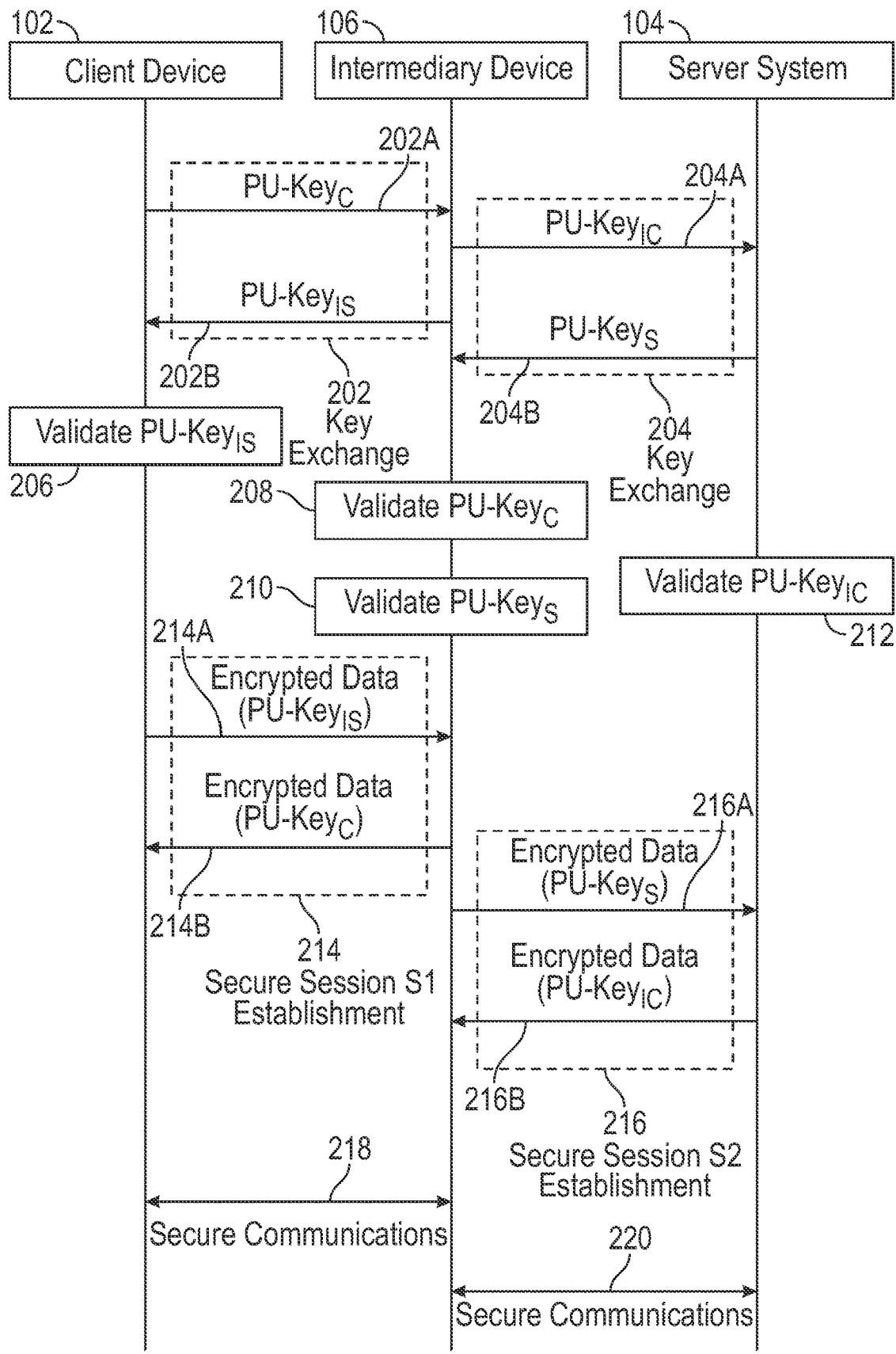
FIG. 2 is a flow diagram of a process involving the client device, the intermediary device, and the server system, according to some examples.

FIG. 2 is a message flow diagram of the process that involves the client device 102, the intermediary device 106, and the server system 104. Although FIG. 2 shows a specific order of tasks, in other examples, the tasks may be performed in a different order, some of the tasks may be omitted, and additional tasks may be added.

As shown in FIG. 2, the client device 102 and the intermediary device 106 can exchange (at 202) their respective public keys. More specifically, the client device 102 sends (at 202A) the client public key PU-KEY$_C$ to the intermediary device 106, and the intermediary device 106 sends (at 202B) the intermediary server public key PU-KEY$_{IS}$ to the client device 102.

Similarly, the intermediary device 106 and the server system 104 can exchange (at 204) their respective public keys. More specifically, the intermediary device 106 sends (at 204A) the intermediary client public key PU-KEY$_{IC}$ to the server system 104, and the server system 104 sends (at 204B) the server public key PU-KEY$_S$ to the intermediary device 106.

The authentication engine 132 in the client device 102 can validate (at 206) the intermediary server public key PU-KEY$_{IS}$ such as by comparing the intermediary server public key PU-KEY$_{IS}$ received from the intermediary device 106 to server public keys in the list of known servers 142. If the received intermediary server public key PU-KEY$_{IS}$ matches a server public key in the list of known servers 142, the client device 102 confirms that the received intermediary server public key PU-KEY$_{IS}$ is validated.

Similarly, the authentication engine 136 in the intermediary device 106 validates (at 208) the client public key PU-KEY$_C$, such as by comparing the client public key PU-KEY$_C$ received from the client device 102 to client public keys in the list of known clients 146. If the received client public key PU-KEY$_C$ matches a client public key in the list of known clients 146, the intermediary device 106 confirms that the received client public key PU-KEY$_C$ is validated. In other examples, other techniques of validating a public key can be performed, such as by using a fingerprint (e.g., a cryptographic hash) of the public key according to the SSH protocol, or a root of trust technique according to the HTTPS protocol.

The authentication engine 136 in the intermediary device 106 further validates (at 210) the server public key PU-KEY$_S$, such as by comparing the server public key PU-KEY$_S$ received from the server system 104 to server public keys in the list of known servers 148. If the received server public key PU-KEY$_S$ matches a server public key in the list of known servers 138, the intermediary device 106 confirms that the received server public key PU-KEY$_S$ is validated.

The authentication engine 134 in the server system 104 validates (at 212) the intermediary client public key PU-KEY$_{IC}$, such as by comparing the client public key PU-KEY$_{IC}$ received from the intermediary device 106 to client public keys in the list of known clients 144. If the received intermediary client public key PU-KEY$_{IC}$ matches a client public key in the list of known clients 144, the server system 104 confirms that the received intermediary client public key PU-Key$_{IC}$ validated.

Assuming successful validation of the respective public keys (at 206, 208, 210, 212), the client device 102, the intermediary device 106, and the server system 104 can proceed to establish secure sessions (including S1 and S2 in FIG. 1). between the client device 102 and the intermediary device 106, and between the intermediary device 106 and the server system 104.

To establish (at 214) the secure session S1 between the client device 102 and the intermediary device 106, the client device 102 sends (at 214A) first encrypted data (encrypted using the intermediary server public key PU-KEY$_{IS}$) to the intermediary device 106, which decrypts the first encrypted data from the client device 102 using the intermediary server private key PR-KEY$_{IS}$ to produce first decrypted data. As part of the mutual authentication between the intermediary device 106 and the client device 102, the authentication engine 132 in the client device 102 can authenticate the intermediary device 106 based on the first decrypted data (e.g., by detecting that the first encrypted data was successfully decrypted, or by comparing the first decrypted data to stored data, or by another technique).

To establish (at 214) the secure session S1, the intermediary device 106 sends (at 214B) second encrypted data (encrypted using the client public key PU-KEY$_C$) to the client device 102, which decrypts the second encrypted data from the intermediary device 106 using the client private key PR-KEY$_C$ to produce second decrypted data. As part of the mutual authentication between the intermediary device 106 and the client device 102, the authentication engine 134 in the intermediary device 106 can authenticate the client device 102 based on the second decrypted data. Note that the mutual authentication between the intermediary device 106 and the client device 102 is part of the secure session S1 establishment, in which a cryptographic algorithm and ciphers are negotiated between the intermediary device 106 and the client device 102, such as according to the SSH protocol.

Similarly, to establish (at 216) the secure session S2 between the intermediary device 106 and the server system 104, the intermediary device 106 sends (at 216A) third encrypted data (encrypted using the server public key PU-KEY$_S$) to the server system 104, which decrypts the third encrypted data from the intermediary device 106 using the server private key PR-KEY$_S$ to produce third decrypted data. As part of the mutual authentication between the intermediary device 106 and the server system 104, the authentication engine 134 in the server system 104 can authenticate the intermediary device 106 based on the third decrypted data. To establish (at 216) the secure session S2, the server system 104 sends (at 216B) fourth encrypted data (encrypted using the intermediary client public key PU-KEY$_{IC}$) to the intermediary device 106, which decrypts the fourth encrypted data received from the server system 104 using the intermediary client private key PR-KEY$_{IC}$ to produce fourth decrypted data. As part of the mutual authentication between the intermediary device 106 and the server system 104, the authentication engine 134 in the intermediary device 106 can authenticate the server system 104 based on the fourth decrypted data. Note that the mutual authentication between the intermediary device 106 and the server system 104 is part of the secure session S2 establishment, in which a cryptographic algorithm and ciphers are negotiated between the intermediary device 106 and the server system 104, such as according to the SSH protocol.

Note that the data exchanged among the client device 102, the intermediary device 106, and the server system 104 to establish the secure sessions S1 and S2 include authentication messages and any further data associated with session establishment.

Once the secure sessions S1 and S2 are established, the client device and the intermediary device 106 can perform secure communications (at 218) through the secure session S1, and the intermediary device 106 and the server system 104 can perform (at 220) secure communications through the secure session S2.

In some examples, key rotation may be performed at the intermediary device 106. A "key rotation" refers to generating a new key to replace a prior key. A key rotation can be triggered in response to an event, e.g., an expiration of a timer, detection of a security issue in the intermediary device 106 or a system coupled to the intermediary device 106, or any other event.

Once triggered, a key rotation can cause the intermediary device 106 to generate a new intermediary server public key to replace an existing intermediary server public key, and generate a new intermediary client public key to replace an existing intermediary client public key. In response to the generation of the new intermediary server public key, the intermediary device 106 generates a corresponding new intermediary server private key, and updates a respective entry in the client-side mapping information segment 112A with the new intermediary server public key and the corresponding new intermediary server private key. Similarly, in response to the generation of the new intermediary client public key, the intermediary device 106 generates a corresponding new intermediary client private key, and updates a respective entry in the server-side mapping information segment 112B with the new intermediary client public key and the corresponding new intermediary client private key.

In some examples, the intermediary device 106 can be used to perform various workflows involving the client device 102 and the server system 104. For example, the client device 102 may issue commands to the server system 104, which can execute the commands at the server system 104. The commands are sent by the client device 102 to the intermediary device 106, which is able to validate the commands. If a command is validated by the intermediary device 106, the intermediary device 106 can forward the command to the server system 104. If a command is not validated by the intermediary device 106, then the intermediary device 106 can drop the command.

In another example, the client device 102 can access a sub-system coupled to the server system 104. The intermediary device 106 can be used to determine whether the sub-system access is to be allowed.

In a further example, the client device 102 may transfer data (e.g., files) to the server system 104. The intermediary device 106 can include a malware protection program to determine if the transferred data contains malware. The intermediary device 106 may also set up a sandbox for the transferred data to isolate the transferred data from other processes.

Figure 3:
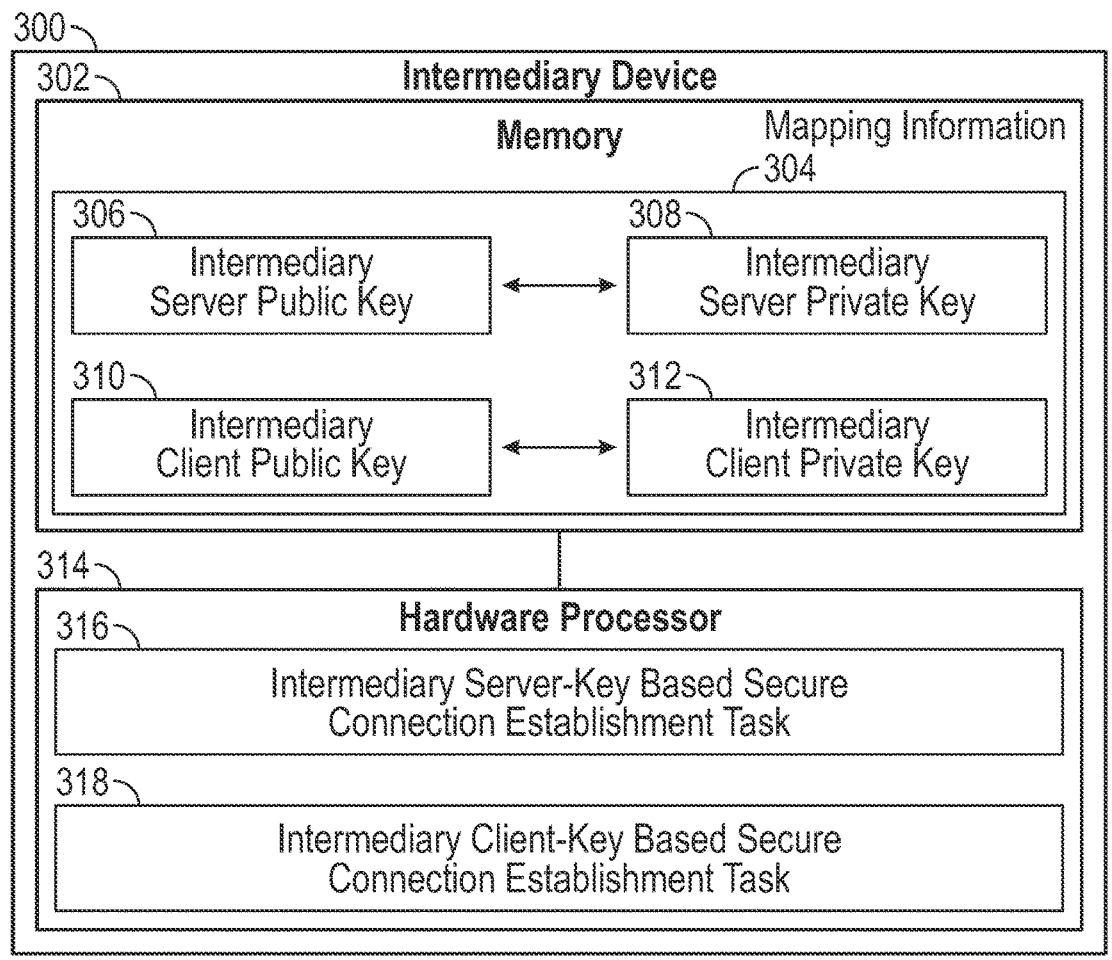
FIG. 3 is a block diagram of an intermediary device according to some examples.

FIG. 3 is a block diagram of an intermediary device 300 according to some examples of the present disclosure. The intermediary device 300 may be an example of the intermediary device 106 of FIG. 1 and FIG. 2.

The intermediary device 300 includes a memory 302 to store mapping information 304 correlating an intermediary server public key 306 to an intermediary server private key 308 of the intermediary device 300, and correlating an intermediary client public key 310 to an intermediary client private key 312 of the intermediary device 300.

The intermediary device 300 includes a hardware processor 314 (or multiple hardware processors) to perform various tasks. A hardware processor can include a microprocessor, a core of a multi-core microprocessor, a microcontroller, a programmable integrated circuit, a programmable gate array, or another hardware processing circuit. A hardware processor performing a task can refer to a single hardware processor performing the task or multiple hardware processors performing the task.

The tasks of the hardware processor 314 include an intermediary server-key based secure connection establishment task 316 to establish a first secure connection between the intermediary device 300 and the client device using the intermediary server public key 306 and the intermediary server private key 308 correlated by the mapping information 304. In the first secure connection, the intermediary device 300 acts as a server to the client device. In some examples, establishing of the first secure connection includes a mutual authentication between the intermediary device 300 and the client device that is based on use of the intermediary server public key 306 to encrypt a first message from the client device to the intermediary device 300, and use of the intermediary server private key 308 to decrypt the encrypted first message at the intermediary device 300. The mutual authentication between the intermediary device 300 and the client device is further based on use of a client public key of the client device to encrypt a second message sent from the intermediary device 300 to the client device.

The tasks of the hardware processor 314 include an intermediary client-key based secure connection establishment task 319 to establish a second secure connection between the intermediary device 300 and the server system using the intermediary client public key 310 and the intermediary client private key 312 correlated by the mapping information 304. In the second secure connection, the intermediary device 300 acts as a client to the server system. In some examples, establishing the second secure connection includes a mutual authentication between the intermediary device 300 and the server system that is based on use of the intermediary client public key 310 to encrypt a third message from the server system to the intermediary device 300, and use of the intermediary client private key 312 to decrypt the encrypted third message at the intermediary device 300. The mutual authentication between the intermediary device 300 and the server system is further based on use of a server public key of the server system to encrypt a fourth message sent from the intermediary device 300 to the server system.

In some examples, the intermediary device 300 sends the intermediary server public key 306 to the client device for use by the client device, and the intermediary device 300 sends the intermediary client public key 310 to the server system for use by the server system.

In some examples, as part of a key rotation performed at the intermediary device 300, the hardware processor 314 generates a new intermediary server public key (which replaces the intermediary server public key 306), and based on the generation of the new intermediary server public key, the hardware processor 314 generates a new intermediary server private key of the intermediary device 300 (which replaces the intermediary server private key 308). The hardware processor 314 updates the mapping information 304 to correlate the new intermediary server public key to the new intermediary server private key.

In some examples, the intermediary device 300 receives a client public key of the client device from the client device. The hardware processor 314 encrypts a message using the client public key of the client device to produce an encrypted message. The hardware processor 314 causes sending of the encrypted message to the client device.

In some examples, the intermediary device 300 receives a server public key of the server system from the server system. The hardware processor 314 encrypts a message using the server public key of the server system to produce an encrypted message. The hardware processor 314 causes sending of the encrypted message to the server system.

In some examples, the establishing of the first secure connection is based on use of the intermediary server public key 306 to encrypt a first message from the client device to the intermediary device 300, and use of the intermediary server private key 308 to decrypt the encrypted first message at the intermediary device 300. The establishing of the second secure connection is based on use of the intermediary client public key 310 to encrypt a second message from the server system to the intermediary device 300, and use of the intermediary client private key 312 to decrypt the encrypted second message at the intermediary device 300.

In some examples, the first message is part of an authentication procedure between the client device and the intermediary device 300, and the second message is part of an authentication procedure between the server system and the intermediary device 300.

In some examples, the authentication procedure between the client device and the intermediary device and the authentication procedure between the server system and the intermediary device are according to an SSH protocol or any other protocol that supports authentication of devices.

In some examples, the mapping information 304 correlates a plurality of intermediary server public keys to corresponding intermediary server private keys of the intermediary device. The hardware processor 314 causes sending of the plurality of intermediary server public keys to respective client devices.

In some examples, the mapping information 304 correlates a plurality of intermediary client public keys to corresponding intermediary client private keys of the intermediary device. The hardware processor 314 causes sending of the plurality of intermediary client public keys to respective server systems.

In some examples, the intermediary device 300 sends, to the client device, the intermediary server public key for validation at the client device, and the intermediary device 300 receives, from the client device, a client public key of the client device. The hardware processor 314 validates, at the intermediary device 300, the client public key.

In some examples, the intermediary device 300 sends, to the server system, the intermediary client public key for validation at the server system, and the intermediary device 300 receives, from the server system, a server public key of the server system. The hardware processor 314 validates, at the intermediary device 300, the server public key.

Figure 4:
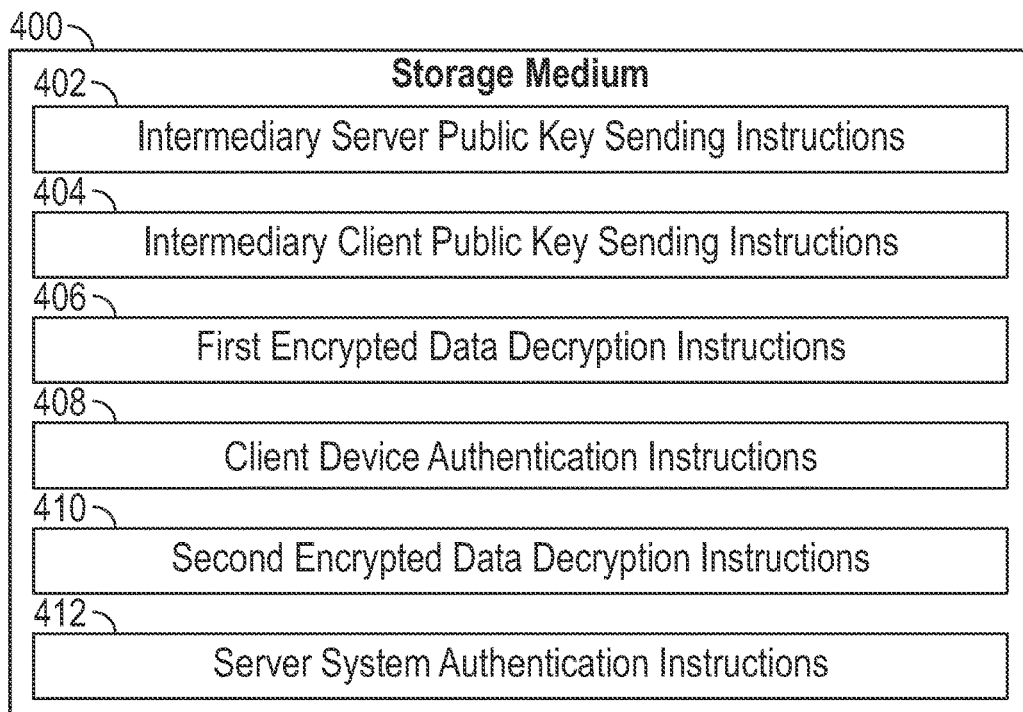
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause an intermediary device to perform various tasks.

The machine-readable instructions include intermediary server public key sending instructions 402 to send an intermediary server public key from the intermediary device to a client device. The intermediary server public key sending instructions 402 when executed causes the intermediary server public key to be sent through a network interface of the intermediary device, to communicate the intermediary server public key over a network to the client device.

The machine-readable instructions include intermediary client public key sending instructions 404 to send an intermediary client public key from the intermediary device to a server system. The intermediary client public key sending instructions 404 when executed causes the intermediary client public key to be sent through the network interface of the intermediary device, to communicate the intermediary client public key over the network to the server system.

The machine-readable instructions include first encrypted data decryption instructions 406 to decrypt first encrypted data received from the client device using an intermediary server private key retrieved from an entry of mapping information that correlates the intermediary server public key and the intermediary server private key. An example of the mapping information is the mapping information 112 of FIG. 1. The machine-readable instructions include client device authentication instructions 408 to authenticate the client device using first decrypted data produced by decrypting the first encrypted data. The authenticating of the client device by the intermediary device is part of mutual authentication between the intermediary device and the client device for establishing a first secure connection between the intermediary device and the client device. The mutual authentication between the intermediary device and the client device is part of establishing a first cryptographic session between the intermediary device and the client device in which the intermediary device and the client device can negotiate a first cryptographic algorithm and ciphers.

The machine-readable instructions include second encrypted data decryption instructions 410 to decrypt second encrypted data received from the server system using an intermediary client private key retrieved from an entry of the mapping information that correlates the intermediary client public key and the intermediary client private key. The machine-readable instructions include server system authentication instructions 412 to authenticate the server system using second decrypted data produced by decrypting the second encrypted data. The authenticating of the server system by the intermediary device is part of mutual authentication between the intermediary device and the server system for establishing a second secure connection between the intermediary device and the server system. The mutual authentication between the intermediary device and the server system is part of establishing a second cryptographic session between the intermediary device and the server system in which the intermediary device and the server system can negotiate a second cryptographic algorithm and ciphers.

Figure 5:
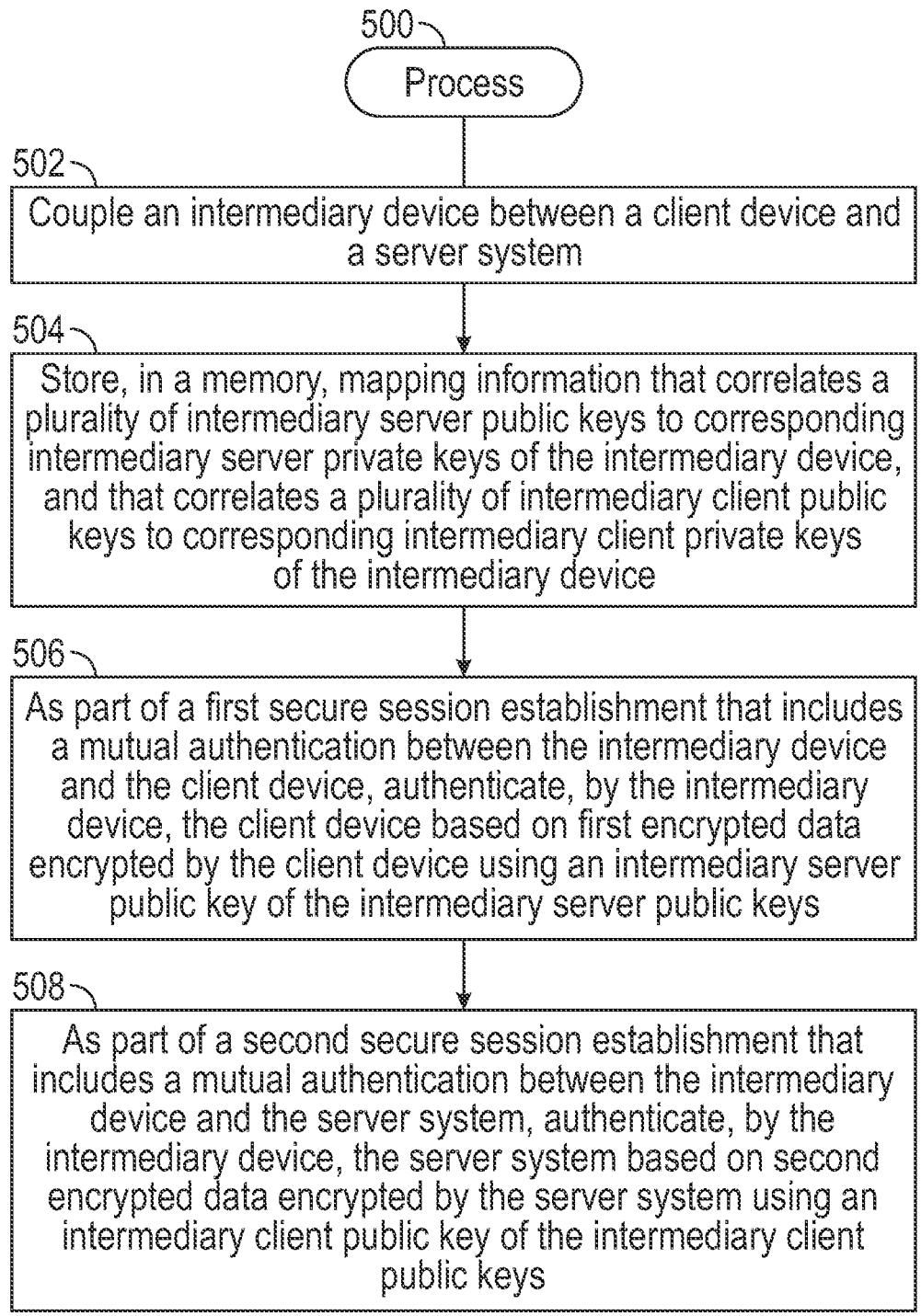
FIG. 5 is a flow diagram of a process according to some examples.

FIG. 5 is a flow diagram of a process 500 according to some examples. The process 500 includes coupling (at 502) an intermediary device between a client device and a server system. The intermediary device behaves as a server to the client device, and the intermediary device behaves as a client to the server system.

The process 500 includes storing (at 504), in a memory, mapping information that correlates a plurality of intermediary server public keys to corresponding intermediary server private keys of the intermediary device, and that correlates a plurality of intermediary client public keys to corresponding intermediary client private keys of the intermediary device. An example of the mapping information is the mapping information 112 of FIG. 1.

The process 500 includes, as part of a first secure session establishment that includes a mutual authentication between the intermediary device and the client device, authenticating (at 506), by the intermediary device, the client device based on first encrypted data encrypted by the client device using an intermediary server public key of the intermediary server public keys. The intermediary device decrypts the first encrypted data using an intermediary server private key correlated to the intermediary server public key by the mapping information.

The process 500 includes, as part of a second secure session establishment that includes a mutual authentication between the intermediary device and the server system, authenticating (at 508), by the intermediary device, the server system based on second encrypted data encrypted by the server system using an intermediary client public key of the intermediary client public keys. The intermediary device decrypts the second encrypted data using an intermediary client private key correlated to the intermediary client public key by the mapping information.

A storage medium (e.g., 400 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An intermediary device to be provided between a client device and a server system, the intermediary device comprising:
  a memory to
    store mapping information correlating an intermediary server public key to an intermediary server private key of the intermediary device, and correlating an intermediary client public key to an intermediary client private key of the intermediary device; and
    store instructions that upon execution cause the intermediary device to act as a proxy server to the client device and as a proxy client to the server system; and
  a hardware processor to
    establish, as the proxy server, a first secure connection between the intermediary device and the client device using the intermediary server public key and the intermediary server private key correlated by the mapping information, wherein establishing the first secure connection comprises a mutual authentication between the intermediary device and the client device; and
    establish, as the proxy client, a second secure connection between the intermediary device and the server system using the intermediary client public key and the intermediary client private key correlated by the mapping information, wherein establishing the second secure connection comprises a mutual authentication between the intermediary device and the server system.

2. The intermediary device of claim 1, wherein the intermediary device is to:
  send the intermediary server public key to the client device for use by the client device; and
  send the intermediary client public key to the server system for use by the server system.

3. The intermediary device of claim 2, wherein the hardware processor is to:
  generate a new intermediary server public key as part of a key rotation performed at the intermediary device;

based on the generation of the new intermediary server public key, generate a new intermediary server private key of the intermediary device; and update the mapping information to correlate the new intermediary server public key to the new intermediary server private key.

4. The intermediary device of claim 1, wherein the intermediary device is to receive a client public key of the client device from the client device, and wherein the hardware processor is to:

as part of the mutual authentication between the intermediary device and the client device, encrypt a message using the client public key of the client device to produce an encrypted message; and cause sending of the encrypted message to the client device.

5. The intermediary device of claim 1, wherein the intermediary device is to receive a server public key of the server system from the server system, and wherein the hardware processor is to:

as part of the mutual authentication between the intermediary device and the server system, encrypt a message using the server public key of the server system to produce an encrypted message; and cause sending of the encrypted message to the server system.

6. The intermediary device of claim 1, wherein the establishing of the first secure connection comprising the mutual authentication between the intermediary device and the client device is based on use of the intermediary server public key to encrypt a first message from the client device to the intermediary device, and use of the intermediary server private key to decrypt the encrypted first message at the intermediary device, and wherein the establishing of the second secure connection comprising the mutual authentication between the intermediary device and the server system is based on use of the intermediary client public key to encrypt a second message from the server system to the intermediary device, and use of the intermediary client private key to decrypt the encrypted second message at the intermediary device.

7. The intermediary device of claim 6, wherein the mutual authentication between the client device and the intermediary device and the mutual authentication between the server system and the intermediary device are according to a Secure Shell (SSH) protocol.

8. The intermediary device of claim 1, wherein the mapping information correlates a plurality of intermediary server public keys to corresponding intermediary server private keys of the intermediary device, wherein the hardware processor is to:

cause sending of the plurality of intermediary server public keys to respective client devices.

9. The intermediary device of claim 1, wherein the mapping information correlates a plurality of intermediary client public keys to corresponding intermediary client private keys of the intermediary device, wherein the hardware processor is to:

cause sending of the plurality of intermediary client public keys to respective server systems.

10. The intermediary device of claim 1, wherein the hardware processor is to:

send, from the intermediary device to the client device, the intermediary server public key for validation at the client device;

receive, at the intermediary device from the client device, a client public key of the client device; and validate, at the intermediary device, the client public key.

11. The intermediary device of claim 1, wherein the hardware processor is to:

send, from the intermediary device to the server system, the intermediary client public key for validation at the server system;

receive, at the intermediary device from the server system, a server public key of the server system; and validate, at the intermediary device, the server public key.

12. A non-transitory machine-readable storage medium comprising instructions that upon execution cause an intermediary device to:

send an intermediary server public key from the intermediary device to a client device;

send an intermediary client public key from the intermediary device to a server system;

decrypt first encrypted data received from the client device using an intermediary server private key retrieved from an entry of mapping information that correlates the intermediary server public key and the intermediary server private key;

authenticate the client device using first decrypted data produced by decrypting the first encrypted data, wherein the authenticating of the client device by the intermediary device is part of mutual authentication between the intermediary device and the client device for establishing a first secure connection between the intermediary device and the client device;

decrypt second encrypted data received from the server system using an intermediary client private key retrieved from an entry of the mapping information that correlates the intermediary client public key and the intermediary client private key; and authenticate the server system using second decrypted data produced by decrypting the second encrypted data, wherein the authenticating of the server system by the intermediary device is part of mutual authentication between the intermediary device and the server system for establishing a second secure connection between the intermediary device and the server system.

13. The non-transitory machine-readable storage medium of claim 12, wherein the mutual authentication between the intermediary device and the client device is part of establishing a first cryptographic session between the intermediary device and the client device, and wherein the mutual authentication between the intermediary device and the server system is part of establishing a second cryptographic session between the intermediary device and the server system.

14. The non-transitory machine-readable storage medium of claim 12, wherein the intermediary device acts as a server to the client device, and acts as a client to the server system.

15. The non-transitory machine-readable storage medium of claim 12, wherein the instructions upon execution cause the intermediary device to:

send, from the intermediary device to the client device, third encrypted data encrypted using a client public key of the client device, the third encrypted data for use by the client device in authenticating the intermediary device as part of the mutual authentication between the intermediary device and the client device; and send, from the intermediary device to the server system, fourth encrypted data encrypted using a server public key of the server system, the fourth encrypted data for use by the server system in authenticating the intermediary device as part of the mutual authentication between the intermediary device and the server system.

16. The non-transitory machine-readable storage medium of claim 15, wherein the instructions upon execution cause the intermediary device to:
receive, at the intermediary device, the client public key from the client device; and
receive, at the intermediary device, the server public key from the server system.

17. The non-transitory machine-readable storage medium of claim 12, wherein the instructions upon execution cause the intermediary device to:
perform a key rotation at the intermediary device, the key rotation comprising:
generating a new intermediary server public key to replace the intermediary server public key;
based on the generation of the new intermediary server public key, generating a new intermediary server private key of the intermediary device;
generating a new intermediary client public key to replace the intermediary client public key;
based on the generation of the new intermediary client public key, generating a new intermediary client private key of the intermediary device; and
updating the mapping information to correlate the new intermediary server public key to the new intermediary server private key, and to correlate the new intermediary client public key to the new intermediary client private key.

18. The non-transitory machine-readable storage medium of claim 12, wherein the mapping information correlates a plurality of intermediary server public keys to corresponding intermediary server private keys of the intermediary device, and the mapping information correlates a plurality of intermediary client public keys to corresponding intermediary client private keys of the intermediary device.

19. A method comprising:
coupling an intermediary device between a client device and a server system, wherein the intermediary device behaves as a server to the client device, and the intermediary device behaves as a client to the server system;
storing, in a memory, mapping information that correlates a plurality of intermediary server public keys to corresponding intermediary server private keys of the intermediary device, and that correlates a plurality of intermediary client public keys to corresponding intermediary client private keys of the intermediary device;
as part of a first secure session establishment that includes a mutual authentication between the intermediary device and the client device, authenticating, by the intermediary device, the client device based on first encrypted data encrypted by the client device using a first intermediary server public key of the intermediary server public keys; and
as part of a second secure session establishment that includes a mutual authentication between the intermediary device and the server system, authenticating, by the intermediary device, the server system based on second encrypted data encrypted by the server system using a first intermediary client public key of the intermediary client public keys.

20. The method of claim 19, wherein:
the mutual authentication between the intermediary device and the client device further comprises sending, from the intermediary device, the first intermediary server public key to the client device, and receiving, at the intermediary device, encrypted data encrypted by the client device using the first intermediary server public key; and
the mutual authentication between the intermediary device and the server system comprises sending, from the intermediary device, the first intermediary client public key to the server system and receiving, at the intermediary device, encrypted data encrypted by the server system using the first intermediary client public key.

* * * * *